United States Patent
Andreu et al.

(10) Patent No.: US 11,630,446 B2
(45) Date of Patent: Apr. 18, 2023

(54) RELUCTANT FIRST PRINCIPLES MODELS

(71) Applicant: AspenTech Corporation, Bedford, MA (US)

(72) Inventors: Victoria Gras Andreu, Cambridge, MA (US); Sven Serneels, Waltham, MA (US)

(73) Assignee: AspenTech Corporation, Bedford, MA (US)

( * ) Notice: Subject to any disclaimer, the term of this patent is extended or adjusted under 35 U.S.C. 154(b) by 298 days.

(21) Appl. No.: 17/176,882

(22) Filed: Feb. 16, 2021

(65) Prior Publication Data
US 2022/0260980 A1    Aug. 18, 2022

(51) Int. Cl.
*G05B 19/418* (2006.01)
*G06N 20/00* (2019.01)

(52) U.S. Cl.
CPC ....... *G05B 19/41885* (2013.01); *G06N 20/00* (2019.01)

(58) Field of Classification Search
CPC ... G05B 19/41885; G05B 17/02; G06N 20/00
USPC .................................................. 700/108–129
See application file for complete search history.

(56) References Cited

U.S. PATENT DOCUMENTS

| 5,301,101 A | 4/1994 | Macarthur et al. |
| 5,410,634 A * | 4/1995 | Li ............... G05B 13/0235 706/62 |
| 5,640,491 A | 6/1997 | Bhat et al. |
| 5,682,309 A | 10/1997 | Bartusiak et al. |
| 6,056,781 A | 5/2000 | Wassick et al. |
| 6,088,630 A | 7/2000 | Cawlfield |

(Continued)

FOREIGN PATENT DOCUMENTS

| CN | 106600000 A | 4/2017 |
| CN | 107430398 A | 12/2017 |

(Continued)

OTHER PUBLICATIONS

Fellini, Ryan, et al. "Optimal design of automotive hybrid powertrain systems." Proceedings First International Symposium on Environmentally Conscious Design and Inverse Manufacturing. IEEE, 1999.pp. 400-405 (Year: 1999).*

(Continued)

*Primary Examiner* — Satish Rampuria
(74) *Attorney, Agent, or Firm* — Hamilton, Brook, Smith & Reynolds, P.C.

(57) ABSTRACT

Computer implemented methods and systems generate an improved predicted model of an industrial process or process engineering system. The model is a function of measurable features of the subject process and selected first principle features. First principle features are selected that capture linearities in a residual of a linear model constructed using a received dataset of the subject process. The model can further be a function of a scaled spline. The scaled spline is generated by computing a spine for a measurable feature of the subject process, fitting the computer spline to the residual of the constructed linear model, and scaling the fitting spline with a scaling factor. The model results in improved predictions of behavior of the subject process by relying primarily on the data of the measurable features of the subject process.

17 Claims, 6 Drawing Sheets

(56) References Cited

U.S. PATENT DOCUMENTS

| | | |
|---|---|---|
| 6,937,966 B1 | 8/2005 | Hellerstein et al. |
| 7,050,863 B2 | 5/2006 | Mehta et al. |
| 7,085,615 B2 | 8/2006 | Persson et al. |
| 7,213,007 B2 | 5/2007 | Grichnik |
| 7,257,501 B2 | 8/2007 | Zhan et al. |
| 7,330,804 B2 | 2/2008 | Turner et al. |
| 7,421,374 B2 | 9/2008 | Zhan et al. |
| 8,295,952 B2 | 10/2012 | Macarthur et al. |
| 8,296,070 B2 * | 10/2012 | Paxson .................... G16B 5/00 702/19 |
| 8,560,092 B2 | 10/2013 | Zheng et al. |
| 8,762,301 B1 | 6/2014 | Buckbee, Jr. |
| 9,046,881 B2 | 6/2015 | Blevins et al. |
| 9,141,911 B2 | 9/2015 | Zhao |
| 9,367,804 B1 | 6/2016 | Moon et al. |
| 9,513,610 B2 | 12/2016 | Zheng et al. |
| 9,535,808 B2 | 1/2017 | Bates |
| 9,727,035 B2 | 8/2017 | Keenan et al. |
| 10,031,510 B2 | 7/2018 | Zhao et al. |
| 10,114,367 B2 | 10/2018 | Bates |
| 10,739,752 B2 | 8/2020 | Zhao et al. |
| 10,990,067 B2 | 4/2021 | Modi et al. |
| 2003/0220828 A1 | 11/2003 | Hwang et al. |
| 2004/0153804 A1 | 8/2004 | Blevins et al. |
| 2004/0249481 A1 | 12/2004 | Zheng et al. |
| 2005/0010369 A1 * | 1/2005 | Varpela .................. G16B 50/00 702/19 |
| 2005/0096872 A1 | 5/2005 | Blevins et al. |
| 2006/0136138 A1 * | 6/2006 | Hicklin .................... G16B 5/00 703/11 |
| 2007/0225835 A1 | 9/2007 | Zhu |
| 2008/0183311 A1 | 7/2008 | Macarthur et al. |
| 2011/0066299 A1 | 3/2011 | Gray et al. |
| 2011/0320386 A1 | 12/2011 | Liano et al. |
| 2012/0004893 A1 * | 1/2012 | Vaidyanathan ..... G06F 18/2115 703/11 |
| 2012/0084400 A1 | 4/2012 | Almadi et al. |
| 2012/0221124 A1 | 8/2012 | Thiele et al. |
| 2013/0151179 A1 | 6/2013 | Gray |
| 2013/0151212 A1 | 6/2013 | Gray et al. |
| 2013/0191106 A1 | 7/2013 | Kephart et al. |
| 2013/0246316 A1 | 9/2013 | Zhao et al. |
| 2013/0338842 A1 | 12/2013 | Inoue et al. |
| 2014/0114598 A1 | 4/2014 | Almadi et al. |
| 2014/0115121 A1 | 4/2014 | Almadi et al. |
| 2015/0261200 A1 | 9/2015 | Blevins et al. |
| 2016/0018796 A1 | 1/2016 | Lu |
| 2016/0018797 A1 | 1/2016 | Lu |
| 2016/0171414 A1 | 6/2016 | Lee |
| 2016/0260041 A1 | 9/2016 | Horn et al. |
| 2016/0320768 A1 | 11/2016 | Zhao |
| 2017/0308802 A1 | 10/2017 | Ramsøy et al. |
| 2018/0019910 A1 | 1/2018 | Tsagkaris et al. |
| 2018/0060738 A1 | 3/2018 | Achin et al. |
| 2018/0157225 A1 | 6/2018 | Dave et al. |
| 2018/0341252 A1 | 11/2018 | Lu |
| 2018/0348717 A1 | 12/2018 | Zhao |
| 2019/0095816 A1 | 3/2019 | Lee et al. |
| 2019/0101902 A1 | 4/2019 | Sayyarrodsari et al. |
| 2019/0102352 A1 | 4/2019 | Sayyarrodsari et al. |
| 2019/0102360 A1 | 4/2019 | Sayyarrodsari et al. |
| 2019/0102657 A1 | 4/2019 | Sayyarrodsari et al. |
| 2019/0179271 A1 | 6/2019 | Modi et al. |
| 2019/0188584 A1 | 6/2019 | Rao et al. |
| 2019/0197403 A1 | 6/2019 | Schmidhuber |
| 2019/0236447 A1 | 8/2019 | Cohen et al. |
| 2020/0103838 A1 | 4/2020 | Bertinetti et al. |
| 2020/0175374 A1 | 6/2020 | Hestness et al. |
| 2020/0242483 A1 | 7/2020 | Shashikant Rao et al. |
| 2020/0257969 A1 | 8/2020 | Goloubew et al. |
| 2020/0258157 A1 | 8/2020 | Law |
| 2020/0379442 A1 | 12/2020 | Chan et al. |
| 2020/0387818 A1 | 12/2020 | Chan |
| 2021/0034023 A1 | 2/2021 | Keenan et al. |
| 2021/0116891 A1 | 4/2021 | Zhao et al. |

FOREIGN PATENT DOCUMENTS

| | | |
|---|---|---|
| EP | 2596613 A2 | 5/2013 |
| EP | 2682914 A1 | 1/2014 |
| EP | 2933976 A1 | 10/2015 |
| EP | 2825920 B1 | 1/2021 |
| GB | 2394564 A | 4/2004 |
| GB | 2409293 A | 6/2005 |
| JP | 06-187004 A | 7/1994 |
| JP | 2004-199655 A | 7/2004 |
| JP | 2004-199656 A | 7/2004 |
| JP | 2005-202934 A | 7/2005 |
| JP | 2008-135010 A | 6/2008 |
| JP | 2009-509217 A | 3/2009 |
| JP | 2009-516301 A | 4/2009 |
| JP | 2010-170586 A | 8/2010 |
| JP | 2011-054163 A | 3/2011 |
| JP | 2013535730 A | 7/2011 |
| JP | 2012-089155 A | 5/2012 |
| JP | 2012-256366 A | 12/2012 |
| JP | 2013-012218 A | 1/2013 |
| JP | 2019521444 A | 7/2019 |
| JP | 2021101388 A | 7/2021 |
| WO | 99/26118 A1 | 5/1999 |
| WO | 00/20939 A1 | 4/2000 |
| WO | 2008/119008 A1 | 10/2008 |
| WO | 2012012723 A2 | 7/2011 |
| WO | 2012118067 A1 | 2/2012 |
| WO | 2013170041 A2 | 11/2013 |
| WO | 2015149928 A2 | 10/2015 |
| WO | 2016093960 A1 | 6/2016 |
| WO | 2018009546 A1 | 1/2018 |
| WO | 2018075995 A1 | 4/2018 |
| WO | 2018223000 A1 | 12/2018 |
| WO | 2019/086760 A1 | 5/2019 |
| WO | 2020227383 A1 | 11/2020 |
| WO | 2020247204 A1 | 12/2020 |
| WO | 2021/025841 A1 | 2/2021 |
| WO | 2021076760 A1 | 4/2021 |

OTHER PUBLICATIONS

Wetter, Michael. "A view on future building system modeling and simulation." Building performance simulation for design and operation. Routledge, 2019. pp. 631-656. (Year: 2019).*

Moraru, Ion I., et al. "Virtual Cell modelling and simulation software environment." IET systems biology 2.5 (2008): pp. 352-362. (Year: 2008).*

Bhutani, N., et al., "First-Principles, Data-Based, and Hybrid Modeling and Optimization of an Industrial Hydrocracking Unit," Ind. Eng. Chem. Res., 45 (23), pp. 7807-7816 (2006).

Brill, et al., "Transportation of liquids in multiphase pipelines under low liquid loading conditions," Ph.D. Dissertation, The University of Tulsa (1995).

Caetano, "Upward vertical two-phase flow through an annulus," Ph.D. Dissertation, The University of Tulsa (1985).

European Search Report Application No. 17 751 159.9, entitled "Computer System And Method For The Dynamic Construction And Online Deployment Of An Operation-Centric First-Principles Process Model For Predictive Analytics." dated Jan. 21, 2020.

Fair, J.R. and Mathews, R.L., "How to predict sieve tray entrainment and flooding," Petro/Chem Engineer 33(10), p. 45, 1961.

Hebert, D., "First-Principle Vs Data-Driven Models—Cost and the Time and Skill Required to Develop an Application—Specific Model have Been Barriers to Using First-Principle Modeling Tools," http://www.controlglobal.com/articles/2008/200/ (2008).

International Search Report and Written Opinion for PCT/US2017/040725 dated Oct. 16, 2017., entitled "Computer System And Method For The Dynamic Construction And Online Deployment Of An Operation-Centric First-Principles Process Model For Predictive Analytics".

S. Joe and F. Y. Kuo, Remark on Algorithm 659: Implementing Sobol's quasirandom sequence generator, ACM Trans. Math. Softw. 29, 49-57 (2003).

(56) References Cited

OTHER PUBLICATIONS

Kister, Distillation Operation (Mechanical-Engineering), Bookmart Press, Inc., p. 376, 1990.
Kister, H.Z. and Haas, J.R., "Predict entrainment flooding on sieve and valve trays," Chemical Engineering Progress, 86(9), p. 63, 1990.
Psichogios, D C. and Ungar, L. H., "A Hybrid Neural Network-First Principles Approach to Process Modeling," AIChE Journal, 38: 1499-1511 (1992).
Pantelides C. C, et al., "The online use of first-principles models in process operations: Review, current status and future needs", Computers & Chemical Engineering, vol. 51, ISSN: 0098-1354, pp. 136-148 (2013).
Rakthanmanon, "Searching and Mining Trillions of Time Series Subsequences under Dynamic Time Warping," the 18th ACM SIGKDD Conference on Knowledge discovery and Data Mining, Aug. 12-16, 2012.
Silver D, et al. "Mastering the game of Go with deep neural networks and tree search," Nature. 2016; 529:484-489.
Silver, D., et al. "Mastering chess and shogi by self-play with a general reinforcement learning algorithm", arXiv:1712.01815V1 [cs AI] Dec. 5, 2017.
Venkatasubramanian , V., "The Promise of Artificial Intelligence in Chemical Engineering: Is It Here, Finally?" AIChE Journal, vol. 65-2, pp. 467- 479 (Dec. 19, 2018).
Yang, "A study of intermittent flow in downward inclined pipes," Ph.D. Dissertation, The University of Tulsa (1996).
Zendehboudi et al., "Applications of hybrid models in chemical, petroleum, and energy systems: A systematic review," Applied Energy, 228: 2539-2566 (2018).
Zhang et al., "Unified model for gas-liquid pipe flow via slug dynamics—Part 1: Model development," Trans. Of the ASME, 25: 266-273 (2003).
Zhang et al., "Unified model for gas-liquid pipe flow via slug dynamics—Part 2: Model validation," Trans. Of the ASME, 25: 274-283 (2003).
Hussein, "Adaptive Artificial Neural Network-Based Models for Instantaneous Power Estimation Enhancement in Electric Vehicles' Li-Ion Batteries", IEEE Transactions On Industry Applications, vol. 55, No. 1, Jan. 1, 2019, 840-849, XP011700440.
Potocnik P, et al., "Neural Net Based Hybrid Modeling of the Methanol Synthesis Process", Neural Processing Letters, Kluwer Academic Publishers, No. 3, Jan. 1, 2000, 219-228. XP0009499661.

Yang, et al., "An integrated multi-task control system for fuel-cell power plants", Decision and Control and European Control Conference (CDC-ECC), 2011 50th IEEE Conference, Dec. 12, 2011, 2988-2993.
International Search Report and Written Opinion for PCT/US2020/031636 dated Jul. 15, 2020, entitled "Combining Machine Learning With Domain Knowledge And First Principles For Modeling In The Process Industries".
International Search Report and Written Opinion for PCT/US2020/034530 dated Jul. 24, 2020, entitled " Asset Optimization Using Integrated Modeling, Optimization, and Artificial Intelligence".
International Search Report and Written Opinion for PCT/US2020/055787 dated Jan. 29, 2021, entitled "System And Methods For Automated Model Development From Plant Historical Data For Advanced Process Control".
International Preliminary Report on Patentability for PCT/US2020/031636 dated Nov. 18, 2021, 11 pages.
International Preliminary Report on Patentability for PCT/US2020/034530 dated Dec. 16, 2021, 8—pages.
International Search Report and Written Opinion received for PCT Patent Application No. PCT/US2020/042239, dated Oct. 14, 2020, 10 pages.
Mohamed, et al., "A Neural-Network-Based Model Predictive Control of Three-Phase Inverter with an Output LC Filter," Cornell University Library, ArXiv:1902.099643v3, XP081457097, whole document, Feb. 22, 2019.
Soliman, M., "Multiple Model Predictive Control for Wind Turbines with Doubly Fed Induction Generators," IEEE Transactions on Sustainable Energy, vol. 2, No. 3, pp. 215-225 (2011).
Zhao, et al., "An Identification Approach to Nonlinear State Space Model for Industrial Multivariable Model Predictive Control," Proceedings of the American Control Conference, Philadelphia, PA, Jun. 1998.
International Preliminary Report on Patentability received for PCT Patent Application No. PCT/US2020/042239, dated Feb. 17, 2022, 8 pages.
International Preliminary Report on Patentability received for PCT Patent Application No. PCT/US2020/055787, dated Apr. 28, 2022, 7 pages.
Tay et al., "Reluctant generalized additive modeling," Department of Statistics, and Department of Biomedical Data Science, Stanford University, Jan. 15, 2020, 20 pages.
Yu et al., "Reluctant Interaction Modeling," Department of Statistics, University of Washington, Seattle, Washington, 98105, Jul. 22, 2019, 32 pages.

* cited by examiner

RELUCTANT FIRST PRINCIPLES MODELS

BACKGROUND

Industrial plants such as oil refineries, chemical complexes, petrochemical, polymer, pharmaceutical and process industries in general use mathematical models to predict, quantify calculate, and make informed decisions regarding control of chemical reactions and processes. Some specific applications of such mathematical models are monitoring single pieces of equipment and advanced process control (APC) which can be used offline or online for real-time decision making. Both applications rely on trustworthy models to yield better and consistent product quality, maximize energy savings and safety, or otherwise optimize a plant's chemical reactions and processes. For example, reducing the output of out-of-specification product will at least cut down energy consumption needed to rework the out-of-specification products. In some cases, such as pharmaceutical manufacturing processes that have to adhere to manufacturing standards, it is prohibited for discarded material to re-enter the process stream, in which case out-of-specification products become wasted raw material with the associated disposal costs and environmental burden. Regarding energy savings, optimization of plant operations can result in a significant reduction of energy consumption. Finally, by identifying patterns that correspond to anomalies, it is possible to avoid safety incidents or plant downtime. Therefore, it is critical that these mathematical models accurately reflect how changes in operating conditions affect the performance and operational yields of modeled equipment/processes so that operators in a plant can identify and resolve bottlenecks and tweak (i.e., adjust) controllable parameters in each unit to achieve the best operating conditions of individual equipment as well as plantwide optimization.

However, it is not enough for these models to just simulate accurately each equipment/process. It is essential that the insights they provide are supported by strong empirical and theoretical evidence that does not conflict with the domain knowledge of the experts in the field. In other words, a model will only be considered trustworthy if it is accurate and if the operators in a plant can understand its behavior. Operating equipment safely and reliably depends strongly on a deep level of understanding of both the process and its model by the plant workers. Thus, there exists a need for improved techniques in modeling chemical reactions and industrial processes and improved models of corresponding processes and systems that allow for the creation of advanced and accurate models comprehensible by plant operators and engineers.

SUMMARY

Chemical engineers and operators in a plant leverage different types of computational software and methods to derive the mathematical expressions that model, simulate, design, and optimize chemical processes. Conventional models are often referred to as "first principles" models, as they rely on chemical, physical, and other fundamental laws of nature that govern the different chemical processes and reactions to build mathematical expressions for a given process from the top down. Because of the strong domain knowledge that these models utilize, they are reliable and trusted among chemical engineers. Examples of software that build such models include, but are not limited to, Aspen Plus and Aspen HYSYS. While first principle models accurately reflect the theory behind the reactions, in reality, a wide variety of factors can affect the outcome of a process. Even if introducing all the different factors and interactions that affect the chemical process was possible, the complexity of such a model would be too high and, in practice, likely unsolvable. Therefore, it is impractical, if not impossible, for a first principle model to describe all physical phenomena causing variance in the modeled chemical process leading to potential inaccuracies in their predictions.

To overcome the gap between theory and practice, chemical engineers have shifted towards models derived from actual or simulated plant data. These "data driven" models build the mathematical expressions for a given chemical process (or similar physics-based process) from the bottom up. To aid in the creation of data driven models, many organizations explored the use of Artificial Intelligence (AI) and specifically the use of Machine Learning (ML). While AI can create accurate models of the plant processes from a dataset of plant data, one of the biggest shortcomings of this approach is the lack of domain knowledge that allows the models to be trusted, interpreted, and suitable for extrapolation to different operating conditions. The most powerful state-of-the-art deep learning techniques are known as "black box" models as it is unclear what drives a model to provide certain predictions. This is unacceptable for chemical engineering as it is not only important to know what are the outputs of the model but also the reason behind a model's prediction or how changes in single parameters affect the outputs. Furthermore, another well-known issue of data-driven models is that they require large amounts of training data that can be difficult if not almost impossible to obtain.

Another drawback of the traditional first principle models is their complexity and running time. Deploying first principle models requires solving a system of algebraic and/or differential equations numerically. This can be very expensive from a computational point of view and, in practice, can prevent the models from being used for real-time decision making.

Linear regression models find linear approximations of the response (dependent) variables with respect to the predictor (independent) variables in a dataset. Specifically, linear regression models presume that the relationship between the independent variables and dependent variables is linear and determine the closest hyperplane that best fits the data. Datasets for chemical processes can be used by AI to create linear (or non-linear) regression models that provide useful information about the subject chemical process. Once created, a linear regression model can "predict" the value of a dependent variable based upon independent variables. In other words, predictions are the projections of dependent variable data points onto the hyperplane spanned by the predictor variables. Different linear regression models create different hyperplanes, that is, different coefficients of the independent variables based on their definition of "close." For instance, in the case of Ordinary Least Squares, the closest hyperplane is defined as the one that minimizes the Euclidean distance between a known dependent variable and its corresponding prediction. When applied to chemical processes, linear regression models help predict future behavior of a chemical process. In some cases, complexity may be added to the regression model by applying transformations to select independent features. Predictions from regression models are used in process control and other key functions of industrial plants.

AI data driven solutions, if they are based on simple models, can avoid some of the aforementioned drawbacks and can be trained and deployed in real-time and in many different platforms such as the cloud or the edge. In particular, processes that are linear or quadratic in nature can be modeled using very simple linear or polynomial models based on, for non-liming example, Ordinary Least Squares, Lasso or Ridge Regression. Moreover, linear or polynomial models are very efficient in terms of model building, deployment, and optimization. Another benefit of such models is their high interpretability, which is key for operators in a plant.

Some companies have started exploring Hybrid modeling to capture the benefits of both data driven and first principle models. Hybrid models utilize the power of Machine Learning to analyze a dataset for a process while also incorporating domain knowledge to improve their performance and trust among chemical engineers. The goal is to build an efficient model of a process that can be trained with either plant data or simulation data supplemented with first principles knowledge related to the modeled process.

A popular prior art technique used to build Hybrid models is data augmentation. This method is particularly powerful if using a fairly simple model such as linear regression. Data augmentation adds to the training data features representing chemical properties or dimensionless numbers related to the reactions or processes in question. The augmented training data is then used to create a data driven model. To retain the benefits of simplicity described above, often the data driven model, estimated from original and augmented features, is based on a linear estimator. Classical simulators, such as Aspen HYSYS or Aspen Plus, can approximate the added features using first principle models. Adding these new features addresses two issues. First, it adds domain knowledge into the model. A chemical engineer understands the importance of the added first principle features, since they are based on known properties or natural laws, and can interpret their effect in the model. Second, it adds nonlinearity to the model. The added features are usually obtained via nonlinear transformations of the data and can improve the model's ability to represent complex systems.

While data augmentation has proven successful in creating Hybrid models, there are some aspects of this technique that can make the resulting Hybrid models unsuitable to be used by plant operators. One of the most crucial requirements for these models, besides high accuracy, is high interpretability. Hybrid models, based on data augmentation, incorporate domain knowledge in a seemingly interpretable way, which makes them attractive. However, interpretability is not guaranteed. If a model used to de-bottleneck or improve upon the existing operating conditions of a chemical process via tweaking some of the available controllable parameters relies too heavily on complex and unintuitive first principle transformations, it will be nearly impossible for an operator in a plant to understand how to update the equipment inputs. To avoid this problem, hybrid models should rely mainly on measurable, controllable data, and only use data augmentation when needed to improve their performance. In other words, generating Hybrid model terms and elements derived solely from actual data should be preferred while terms and elements derived from augmented data including the added first principle features should be minimized. However, prior art Machine Learning model creation methods fail to distinguish between plant data and augmented data.

Another aspect that can become problematic with prior art data augmentation methods is high complexity. While the use of Machine Learning can reduce model complexity, incorporation of first principles features re-introduces some of the concerns of the conventional first principle models as these might need to be built via simulators. Moreover, the more features used to train a model, the higher the uncertainty of such a model becomes and the higher the possibility of over fitting. Therefore, one should try to limit the number of augmented features as much as possible. Furthermore, the fewer features used, the faster the model deployment.

The presented innovation is an innovative solution that addresses the current shortcomings of data augmentation based Hybrid Modeling. Embodiments of the present invention create trustworthy robust models that can be easily interpreted by operators in a plant as they rely mainly on observable data while incorporating domain knowledge in a selective way that supplements pure data driven models.

The present invention adopts the Reluctant modeling principle to the field of Chemical Engineering to build robust interpretable Hybrid models. Reluctant Modeling was first introduced by Yu et al., ("Reluctant Interaction Modeling," (2019), arXiv preprint arXiv:1907.08414 pp. 1-32) and Tay et al., ("Reluctant generalized additive modeling," (2020), Xiv preprint arXiv:1912.01808 pp. 1-20) to build less complex and highly interpretable linear and generalized additive models. The principle of reluctant modeling they describe is the following: "one should prefer a linear feature over a non-linear feature if all else is equal". In general, embodiments of the present invention adopt this principle and apply it to the creation of Hybrid modeling as follows:

Reluctant First Principles selection principle: One should prefer measurable features over first principles augmented features if all else is equal.

The present invention provides embodiments (e.g., methods, systems, and techniques) that address the shortcomings of augmentation based Hybrid models by prioritizing pure data driven features and supplementing them with selected first principles only if necessary. Thus, embodiments provide less complex models that can be easily interpreted with faster deployment.

One embodiment provides a computer implemented method for generating an improved predictive model of an industrial process or process engineering system. The first step the method comprises receiving a dataset for a subject physics-based or chemistry-based process in an industrial plant, the dataset including data of measurable features of the subject process. Then the method constructs a linear model of the subject process using the received dataset, the linear model being a function of the measurable features of the subject process and selects first principle features that capture nonlinearities in a residual of the constructed linear model. The method concludes by generating a working model of the subject process, the working model being a function of: (i) the measurable features of the subject process and (ii) the selected first principle features, the working model providing improved predictions of behavior of the subject process by relying primarily on the data of the measurable features of the subject process.

In some embodiment, the method further comprises computing one or more splines for at least one measurable feature, fitting each computed spline to the residual of the constructed linear model, and scaling each fitted spline with a scaling factor so that nonlinear terms are a fraction of the measurable features. In such embodiments, the generated working model is further a function of the scaled spline. The scaling factor may be a hyperparameter of the constructed linear model.

The linear model can be contracted employing machine learning. Constructing the linear model may uses at least one of: an ordinary least squares regression, ridge regression, LASSO regression, partial least squares regression, sparse partial least squares regression, and elastic net regression. The working model may be generated using a LASSO regression with feature selection, the LASSO regression generating a sparse algebraic model with reduced terms.

The constructed linear model may be comprised of linear submodels, each linear submodel describing a dependent variable as a linear expression of independent variables. In such embodiments, the working model is comprised of algebraic submodels, each algebraic submodel describing the dependent variable as an algetic expression of the independent variables.

The first principle features may be selected based on a threshold that is a hyperparameter of the constructed linear model. The data of the measurable features of the subject process may be historical data of the industrial plant.

One embodiment provides a computer-based modeling system for generating an improved predictive model of an industrial process. The system comprises a processor and a memory with computer code instructions stored thereon. The processor and memory are configured to cause the system to: a) receive a dataset for a subject physics-based or chemistry-based process in an industrial plant, the dataset including data of measurable features of the subject process; b) construct a linear model of the subject process using the received dataset, the linear model being a function of the measurable features of the subject process, c) select first principle features that capture nonlinearities in a residual of the constructed linear model; and d) generate a working model of the subject process, the working model being a function of: (i) the measurable features of the subject process and (ii) the selected first principle features, the working model providing improved predictions of behavior of the subject process by relying primarily on the data of the measurable features of the subject process.

The process and memory may be further configured compute one or more splines for at least one measurable feature, fit each computed spline to the residual of the constructed linear model, and scale each fitted spline with a scaling factor so that nonlinear terms are a fraction of the measurable features. In such embodiments, the generated working model is further a function of the scaled spline.

One embodiment provides a non-transitory computer program product for generating an improved predictive model of an industrial process. The computer program comprising a computer-readable medium with computer code instructions stored thereon. The computer code instructions being configured, when executed by a processor, to cause an apparatus associated with the processor to: a) receive a dataset for a subject physics-based or chemistry-based process in an industrial plant, the dataset including data of measurable features of the subject process; b) construct a linear model of the subject process using the received dataset, the linear model being a function of the measurable features of the subject process, c) select first principle features that capture nonlinearities in a residual of the constructed linear model; and d) generate a working model of the subject process, the working model being a function of: (i) the measurable features of the subject process and (ii) the selected first principle features, the working model providing improved predictions of behavior of the subject process by relying primarily on the data of the measurable features of the subject process.

The computer code instructions may be further configured, when executed by the processor, to cause the apparatus associated with the processor to compute one or more splines for at least one measurable feature, fit each computed spline to the residual of the constructed linear model, and scale each fitted spline with a scaling factor so that nonlinear terms are a fraction of the measurable features. In such embodiments, the generated working model is further a function of the scaled spline.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Mathematical models are used to represent subject chemical/industrial processes. These processes can range from an individual reaction (physics-based or chemistry-based) or machinery piece to an entire production unit of an industrial plant. Industrial plants rely on simulations containing these mathematical models for a huge range of vital tasks in real-time or otherwise, online, or offline. For example, a simulation incorporated into an optimizer may use a mathematical model to determine the most efficient manner of operating an individual piece of equipment such as a valve. Alternately, simulations may use mathematical models to determine the best configuration of an entire production unit. Another important application of simulations is their use in controlling the equipment in an industrial plant. They can be applied in every step of process control including long term planning, scheduling and advanced process control. Simulations can actively model current plant conditions and be used for real time applications. Alternatively, simulations can be used to model future conditions and used to determine desired times to perform plant functions or even the design of future plants or modifications to existing plants.

The following disclosure describes methods for creating Hybrid models that combine the benefits of both data driven and first principle models while remaining interpretable for plant operators by prioritizing the use of data driven features and only incorporating augmented features based on augmented first principles when necessary. This is accomplished in part by combining traditional machine learning methods for adding complexity to linear models with reluctant modeling techniques.

Figure 1:
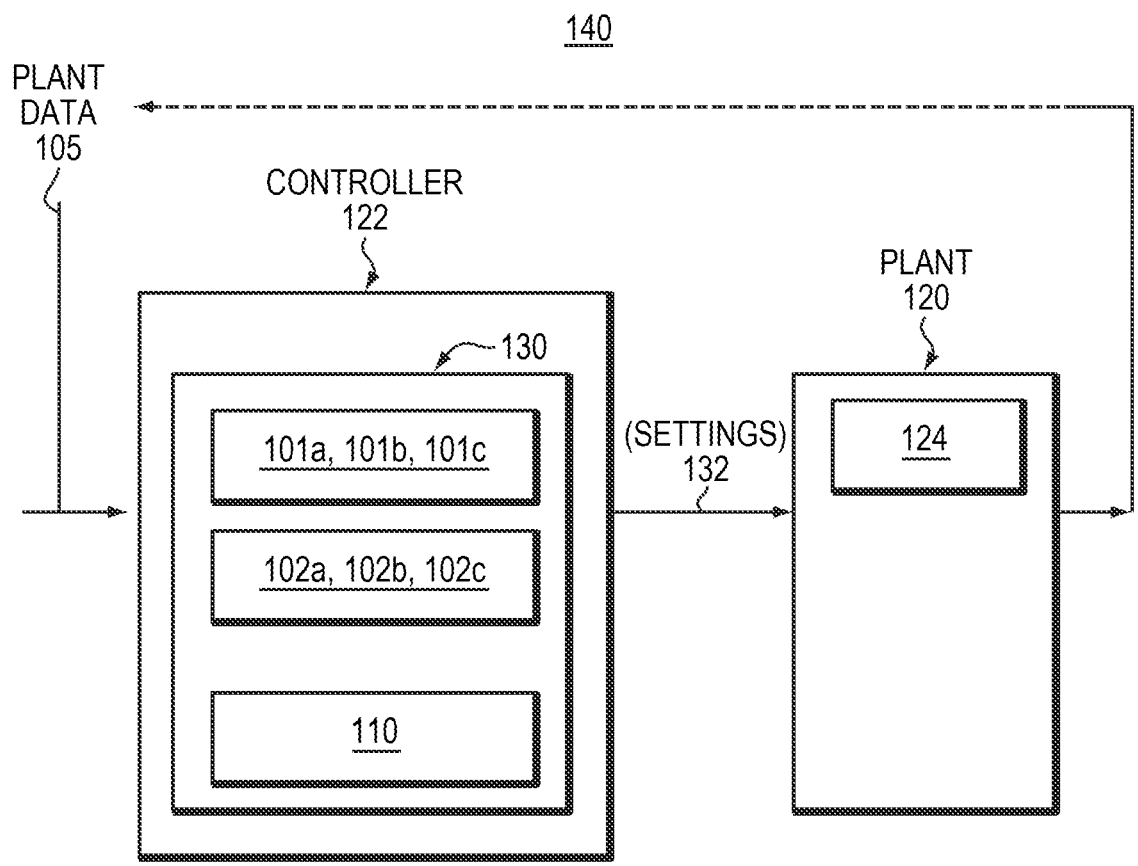
FIG. 1 is a block diagram of a process control (or more generally a process modeling and simulation) method and system embodying the present invention and thus prioritizing data driven features in an improved hybrid model of a chemical/industrial process.

Turning to FIG. 1, illustrated is a process control (or more generally a modeling and simulation) method and system 140 embodying the present invention. The process control method and system 140 employ the mentioned new methods for generating an improved model of a chemical/industrial process 124. Briefly, an industrial plant (chemical processing plant, refinery, or the like) 120 performs chemical processes of interest 124. Non-limiting examples include pharmaceuticals production, petroleum refining, polymer processing, and so on. Plant equipment (at 120) for implementing processes 124 includes distillation columns, various kinds of reactors and reactor tanks, evaporators, pipe systems, valves, heaters, etc. by way of illustration and not limitation. Plant data 105 represents inputs (feed amounts, values of certain variables, etc.) and outputs (products, residuals, physical operating characteristics/conditions, etc.) of the chemical process 124. A controller 122 employs model process control to configure and maintain settings 132 (i.e., parameter values, temperature selection, pressure settings, flow rate, other values of variables representing physical characteristics) operating the plant equipment in carrying out the subject chemical process 124. Controller 122 may also perform longer term planning and scheduling operations for settings 132.

The process control, planning, scheduling, and real-time optimization applications are based on models (of the subject physical, chemical, or engineering process 124) generated by process modeling system 130. Plant 120 may have any number of chemical processes 124, any number of controllers 122, and any number of process modeling systems 130 used to configure and maintain their respective settings 132.

In prior art methods, process modeling system 130 may have utilized first principle, data driven models, and/or Hybrid models. In embodiments of the present invention, the process modeling system 130 generates and deploys models 110 of the subject chemical process 124 generated from received data 101a, 101b, and 101c (generally 101) detailing the physical characteristics and operating conditions of chemical process 124 and from first-principles 102a, 102b, and 102c (generally 102) representing physical properties and/or limitations of the chemical process 124. Data 101a, 101b, and 101c may be received as part of plant data 105, part of a preexisting dataset, a simulated dataset generated by a first principle model, or any combination of the aforementioned. Models 110 may be generated from any amount of received data 101 and first principles 102.

Figure 8:
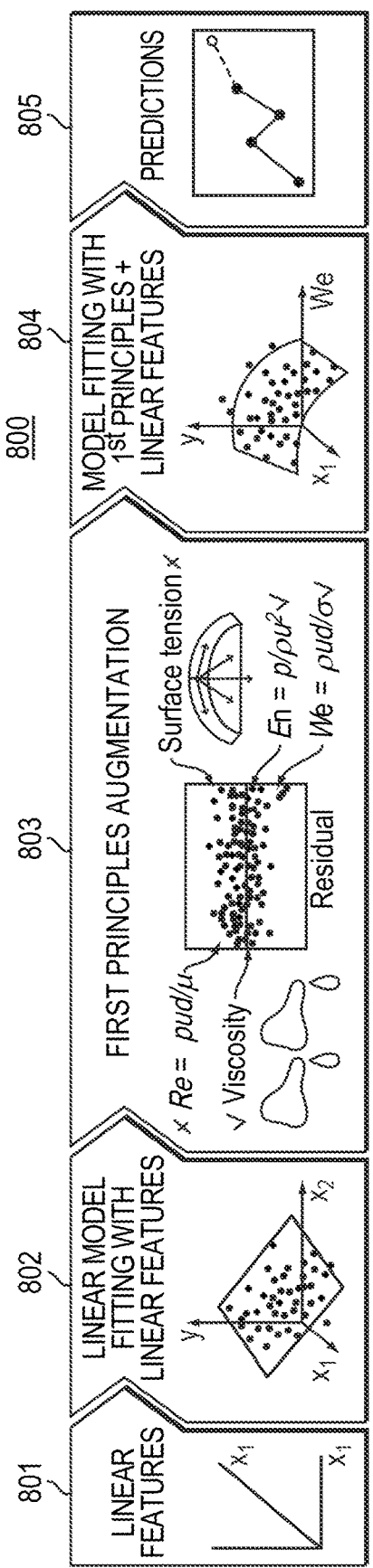
FIG. 8 illustrates a workflow for augmented first principle modeling while respecting the reluctant first principle selection principle of an example embodiment of the invention.
Figure 9:
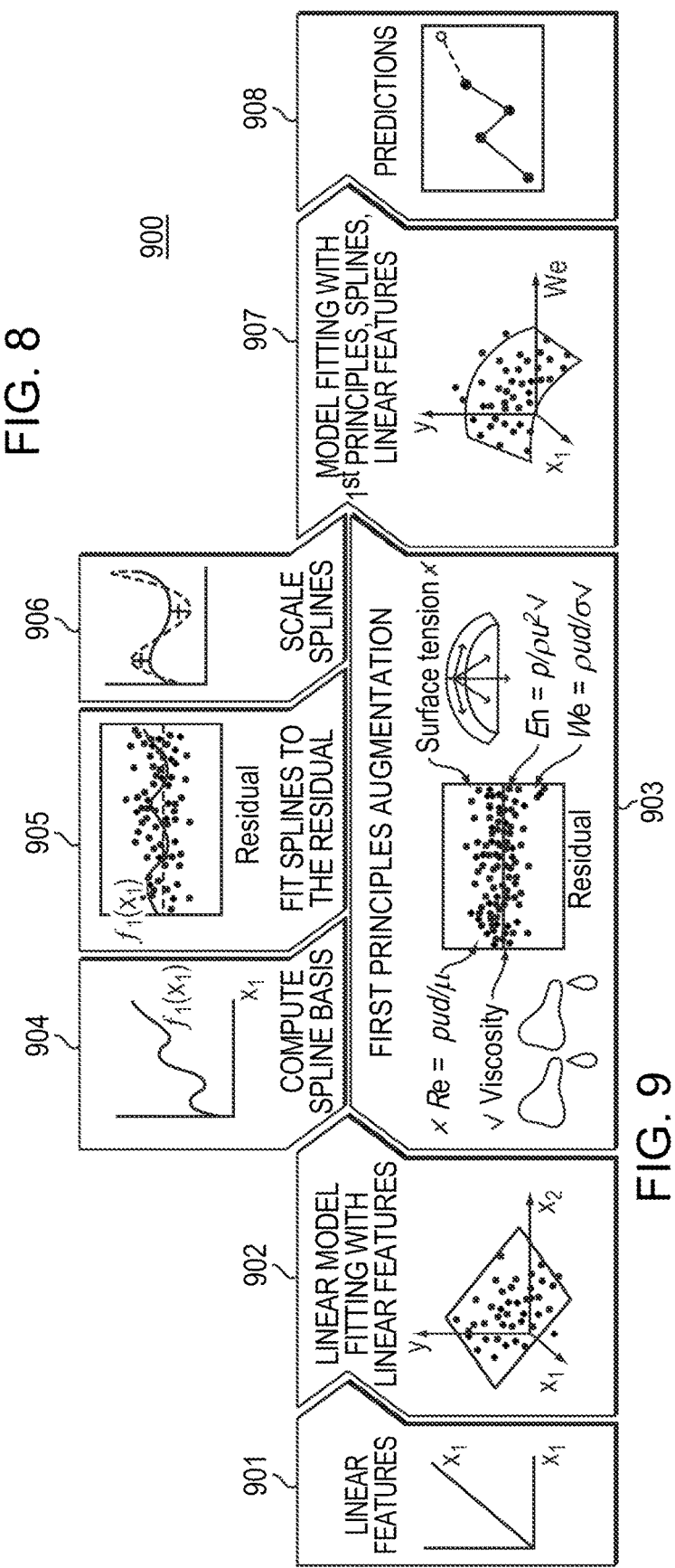
FIG. 9 illustrates a workflow for combined augmented first principle modeling and GAM while respecting the reluctant first principle selection principle of an example embodiment of the invention.

The models 110 (also referred to herein as working models 110) predict, with improved accuracy and interpretability, the progress and physical characteristics/conditions of the subject chemical process 124. The predictions generated by working models 110 also reflect the domain knowledge of first-principles 102a, 102b, and 102c. The predictions enable improved performance and operability of the subject chemical process 124 by any of: enabling a process engineer to more effectively troubleshoot the chemical process, enabling debottlenecking of the chemical process, planning and scheduling actions, optimizing performance of the chemical process at the industrial plant 120, and training new operators of the industrial plant 120. The predictions of models 110 may further include indications of any need to update the settings 132, specific values to quantitatively update the settings 132, and the desired time to update the settings 132. FIGS. 8 and 9 and workflows 800 and 900 further detail the methods by which process modeling system 130 constructs Applicant's inventive and advantageous working models 110 utilized for process modeling, simulation, optimization, and control in system 140.

In a generalized sense, controller 122 is an interface between process modeling system 130 and industrial plant 120. Other interfaces between process modeling system 130 and plant 120 in addition to and/or instead of controller 122 are suitable and in the purview of one skilled in the art given the disclosure herein. For example, there may be an interface between process modeling system 130 and plant 120 systems. There may be a user interface for process modeling system 130. Process modeling system 130 may effectively be part of a simulator or optimizer for non-limiting examples. Various such interfaces enable an end user, e.g., process engineer, to utilize model predictions in (a) monitoring and troubleshooting plant 120 operations and the chemical process of interest 124, in (b) identifying bottlenecks in chemical process 124, in (c) de-bottlenecking the same, and in (d) performing long term planning and scheduling actions, and so forth. In embodiments, an interface enables a process engineer to utilize the model predictions in optimizing (online or offline) the chemical process 124 at the plant 120. In these and other similar ways, embodiments enable various improvements in performance of the chemical process 124 at the subject plant 120.

Process modeling system 130 can also be utilized to design (either entirely or specific modifications to) plant 120. By using models 110 to predict the output of potential designs with hypothetical settings 132, process modeling system 130 can identify what proposed configuration of plant 120 is best suited to a user's needs.

Digital Processing Environment

Example implementations of a computing system and associated methods for combining data driven and selective first principles models with the techniques described herein may be implemented in a software, firmware, or hardware environment.

Figure 2:
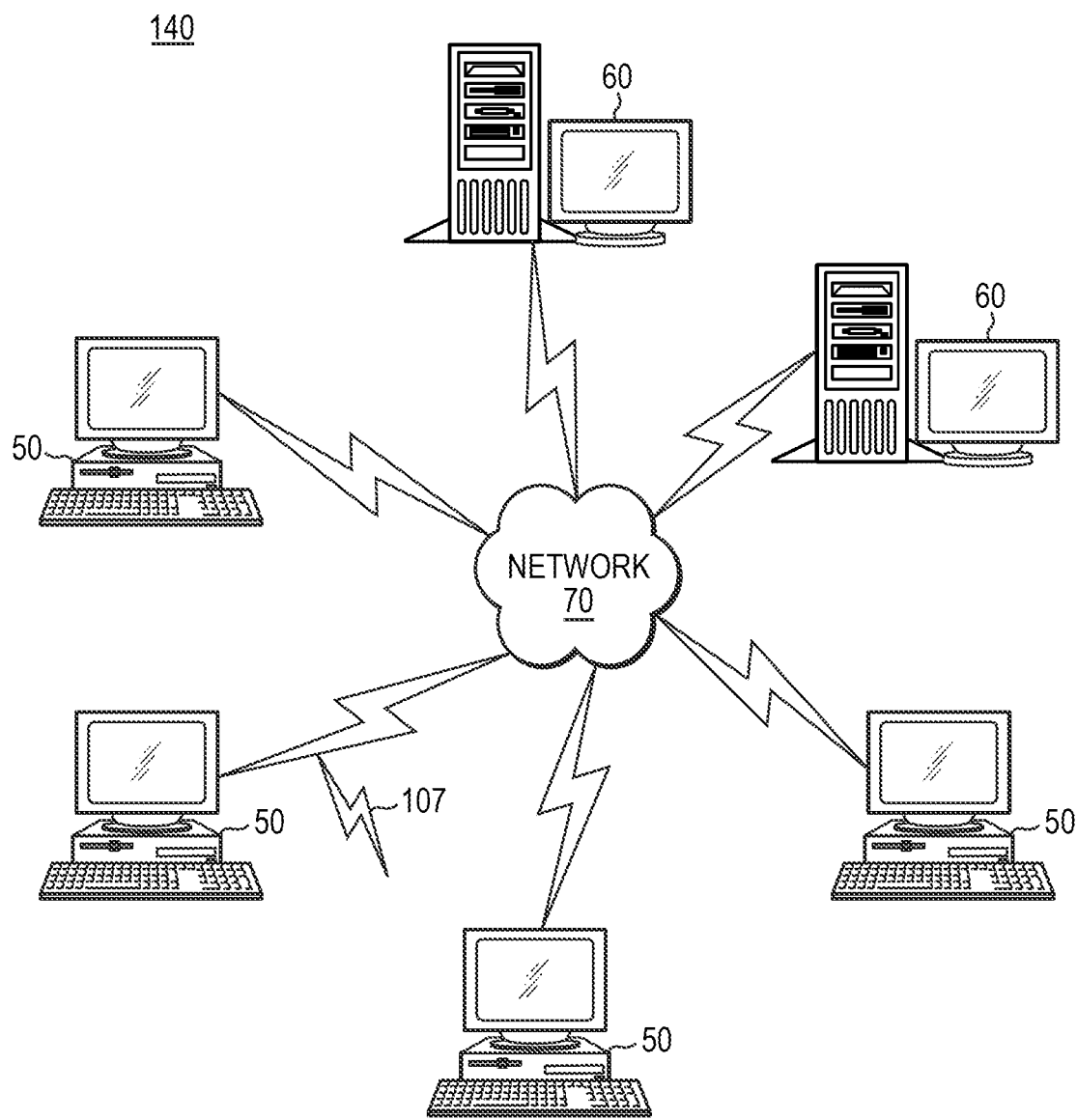
FIG. 2 is a schematic view of a computer network or similar digital processing environment in which embodiments of the present invention may be implemented.

FIG. 2 illustrates a computer network or similar digital processing environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Client computers/devices 50 and server computer(s) 60 may execute any of the computation steps or processes of embodiment workflows 800 and 900 of the invention including constructing linear features 801, 901, linear model fitting 802, 902, first principle augmentation 803, 903, spline computation 904, spline fitting 905, and spline scaling 906, nonlinear model fitting 804, 907, and performing predictions 805, 908. Client computers/devices 50 and server computer(s) 60 may store any of the data utilized in the steps or processes of embodiments of the invention including data 101a, 101b, 101c, and 105, first principle features 102a, 102b, and 102c, and constructed models (both linear and nonlinear) 110. Furthermore, client computers/devices 50 and server computer(s) 60 may be part of system 140 for process control and function as a controller 122 and/or process modeling system 130 to generate and apply working models 110, configure and maintain settings 132, and control subject process 124.

Figure 3:
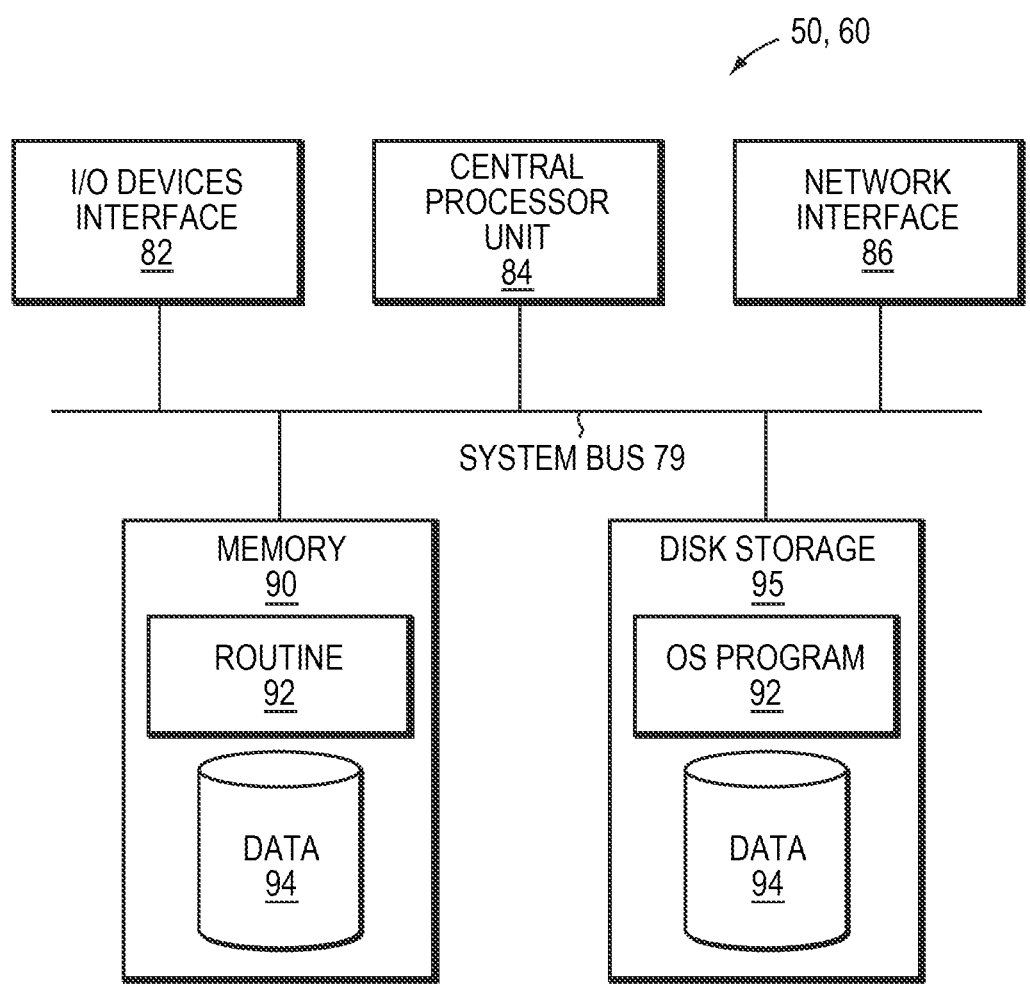
FIG. 3 is a block diagram of the internal structure of a computer node or device (e.g., client processor/device or server computers) in the computer network of FIG. 2.

FIG. 3 is a diagram of the internal structure of a computer (e.g., client processor/device 50 or server computers 60) in the computer system of FIG. 2. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer 50, 60 to connect to various other devices attached to a network (e.g., network 70 of FIG. 2). Memory 90 provides volatile storage for computer software instructions 92 and data 94 used to implement an embodiment 130,140 of the present invention (e.g., modules used to implement workflows of methods 800 and 900, and modules used to generate and apply working models 110). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, cloud storage, SD cards, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier may encompass the foregoing transient signals, propagated signals, propagated medium, storage medium and the like. In other embodiments, the program product 92 may be implemented as a so-called Software as a Service (SaaS), or other installation or communication supporting end-users.

The present invention provides a framework to build simpler and more interpretable linear or generalized additive Hybrid models 110 of a chemical/industrial process 124 of interest. Before describing the details of the invention, a background on the traditional techniques and new lines of research that improve upon them is provided.

Traditional Machine Learning Modeling Methods

While the field of Machine Learning has made significant progress over the past few years, many of the most powerful state-of-the-art modeling techniques do not provide enough transparency in their resulting models in order for those models to be trusted to make predictions and decisions in many fields. Chemical industries are an example where it is vital to understand why a model makes certain predictions. For instance, if a piece of equipment in which a chemical reaction occurs is modeled, based on known laws of nature, an operator can anticipate how certain changes in the reaction's feeds or physical properties such as temperature or pressure will affect the performance of the modeled equipment. If these expectations are not reflected in the composition of the model or cannot be checked, experienced plant operators will not trust such models. Furthermore, if the purpose of building the model is to simulate the expected behavior of the modeled piece of equipment to learn how to operate it, the ability to interpret how changes in model inputs vary the model's outcome is essential. If the model's correlation between its inputs and outputs are unclear or hidden, its use as a teaching instrument is limited.

One attractive aspect of using Machine Learning is the ability to create models with simplicity and smooth properties. Since one might need to use the models for optimization purposes, for instance to obtain the best operating conditions that maximize the profit and safety while minimizing the costs and pollution, smoothness and simplicity are two key properties of a successful robust and fast optimization.

To that end, traditionally, linear models have been used as they address interpretability and simplicity concerns. These models assume the dependent variables are linear combinations of the independent variables. More concretely, if y is a dependent variable and $x_1, \ldots, x_n$ are the independent variables, then $$y \approx a_0 + a_1 x_1 + \ldots + a_n x_n \quad (1),$$

where $a_i$ are constants for $i=0, \ldots, n$.

Interpreting these linear models is straightforward: provided all variables are on the same scale, one can understand which are the most important variables as these will be features whose coefficients have the largest absolute value, and how varying each independent variable will affect the output. For example, if one increases $x_i$ by one unit while fixing the rest of the variables, y will increase or decreases $a_i$ units depending on whether the sign of $a_i$ is positive or negative, respectively.

Sometimes, however, linear models fail to capture enough complexity to accurately model certain processes. In order to build more powerful polynomial models, in traditional Machine Learning, one adds nonlinear transformations of the original main features such as powers and interactions to obtain higher order polynomial models. More concretely, using notations as above, one can approximate y as $$y \approx a_0 + a_1 x_1 + \ldots + a_n x_n + b_{1,1} x_1^2 + b_{1,2} x_1 x_2 + \ldots + b_{n-1,n} x_{n-1} x_n + b_{n,n} x_n^2. \quad (2)$$

for constants $a_i$, $b_{i,j}$, $i, j=1, \ldots, n$. The workflow to fit such model is depicted in FIG. 4.

Figure 4:
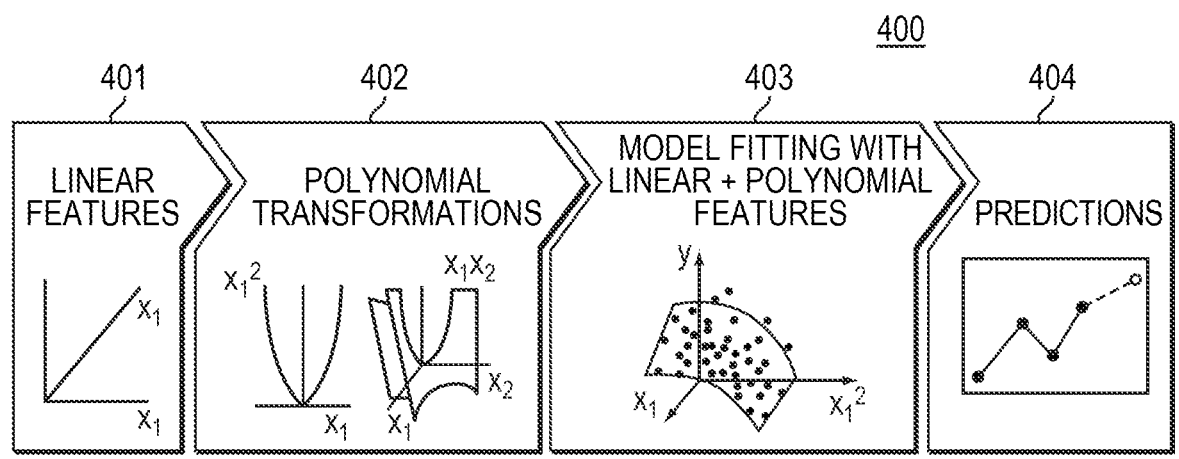
FIG. 4 illustrates a workflow for generating and fitting a linear model with added higher order polynomial features.

FIG. 4 illustrates workflow 400 for generating and fitting a linear model with added higher order polynomial features. The initial step 401, assembles linear features, in the form shown in Equation 1, for dependent variables y. The next step 402, constructs the desired nonlinear higher order polynomial features. These features can include higher power terms of a single variable (e.g. $x_1^2$) and terms with multiple independent variables (e.g. $x_1 x_2$) and all possible combinations of the aforementioned. After both the linear features and nonlinear features are computed, step 403 uses those features to construct a model based on received data 101, 105 of the process 124 to be modeled. The model will take the form of Equation 2 and include both linear terms (from step 401) and nonlinear terms (from step 402). The disclosed method could also be adapted to work with equations other than Equation 2 including, for non-limiting example, different nonlinear feature transforms such as logarithms and exponentials. Any model fitting technique, including AI Machine Learning, can be utilized in step 403. Finally, in step 404 the fitted model (serving as model 110 in FIG. 1) can be used to make predictions about the behavior of the modeled process (e.g., plant process 124). Both FIG. 4 and described workflow 400 show a model with a single dependent variable y and two independent variables $x_1$ and $x_2$. The aforementioned technique is applicable to any amount of independent and dependent variables.

If one chooses to add statistical features such as interactions between variables, one can still interpret which are the most important features but, if many interactions are present, it becomes unfeasible to determine how changing a single variable affects the outcome in general.

Another powerful generalization of linear models that addresses the lack of complexity issue are the so called generalized additive models (GAM). These models assume the dependent variables are linear combinations of univariate smooth functions of each independent variable. In practice, these smooth functions are smoothing splines. More concretely, if y is a dependent variable and $x_1, \ldots, x_n$ are independent variables, then we can approximate y by $$y \approx f_1(x_1) + \ldots + f_n(x_n), \quad (3)$$

where $f_i$ are splines for $i=1, \ldots, n$.

To build such models, one computes the spline basis functions and fits a linear model using those basis.

Figure 5:
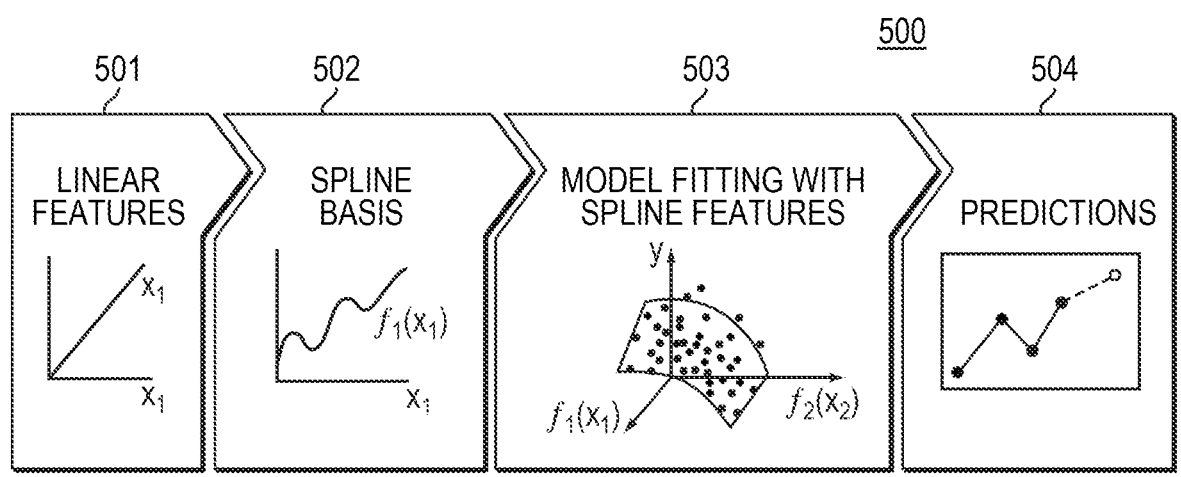
FIG. 5 illustrates a workflow for generating and fitting generalized additive models (GAM).

FIG. 5 illustrates workflow 500 for generating generalized additive models (GAM). The initial step 501, assembles linear features, in the form shown in Equation 1, for dependent variables y. The next step 502, computes the spline basis functions $f_i$ utilizing a dataset of the process 124 to be modeled. Next, step 503 uses linear features (from step 501) and splines (from step 502) to construct a model based on data 101, 105 of the process 124 to be modeled. The model takes the form shown in Equation 3. Any model fitting technique, including AI Machine Learning, can be utilized in step 503. Finally, in step 504 the fitted model (serving as model 110 in FIG. 1) can be used to make predictions about the behavior of the subject modeled process 124. Both FIG. 5 and described workflow 500 show a model with a single dependent variable y and two independent variables $x_1$ and $x_2$ and their corresponding splines $f_1$ and $f_2$. The aforementioned technique is applicable to any amount of independent and dependent variables.

To encourage simple, robust, sparse models, one can use different types of regularization to fit a linear regression model or GAM. The most popular ones are adding a penalty on the L1 norm or the Euclidean norm of the coefficients. These correspond to Lasso or Ridge Regression respectively in the case of linear models. Lasso models are particularly popular when the number of features used to train the model is very large, as its regularization creates an automatic feature selection.

Because there is no interaction between variables, one can study the effect a single independent variable has on the output. This capability of GAMs makes them particularly attractive for operators in a plant as operators can understand and visualize (via sensitivity plots) how changes in each controllable variable would affect the outcome of a process 124 of interest.

Reluctant Modeling Background

This section will briefly explain the principles of reluctant modeling applied to polynomial regression and generalized additive models that can be found in the literature. For a further description refer to Yu et al., ("Reluctant Interaction Modeling," (2019), arXiv preprint arXiv:1907.08414 pp. 1-32) and Tay et al., ("Reluctant generalized additive modeling," (2020), Xiv preprint arXiv:1912.01808 pp. 1-20) which are incorporated herein in their entirety.

While Lasso feature selection is a very powerful technique to build sparse linear models, it doesn't distinguish between features that are the linear main effects and features ("linear features") that are the nonlinear transformations ("nonlinear features"), such as interactions, of the main effects. Therefore, if the predictive power of an original feature is similar to an interaction feature, it could select the non-linear interaction feature creating a more complex and less interpretable model. Moreover, performing Lasso Regression on all main and interaction features is computationally expensive for large amounts of features. To address these issues, reluctant interaction models are introduced. The principle of reluctant interaction models is to prioritize linear features over interaction features if all else is equal.

Figure 6:
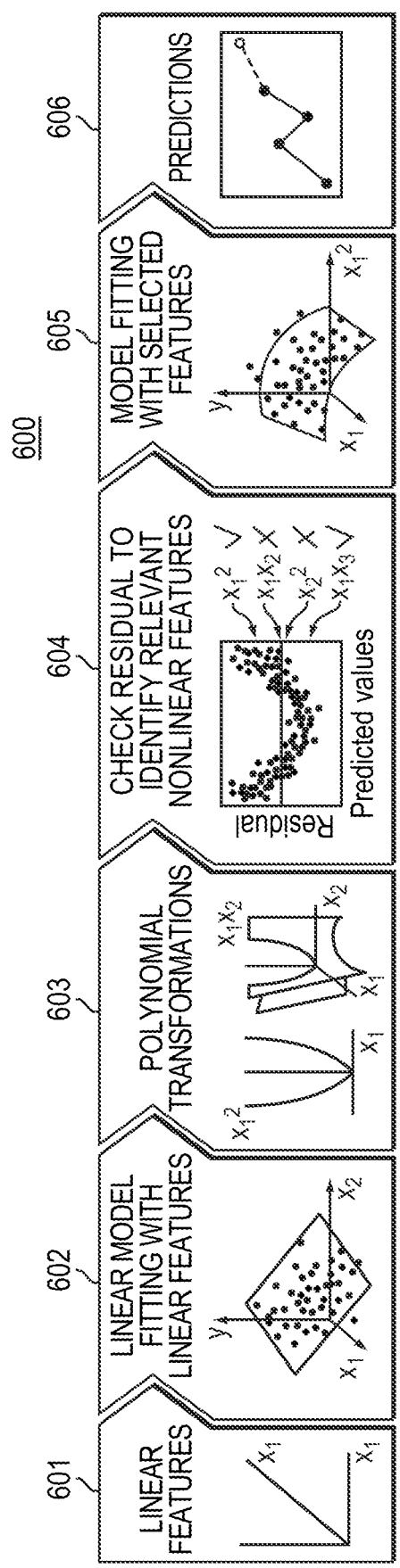
FIG. 6 illustrates a workflow for reluctant modeling applied to polynomial regression.

FIG. 6 illustrates workflow 600 for reluctant modeling applied to polynomial regression. The workflow 600 can be summarized in three main steps: fit a linear model as good as possible using main features only, select interaction terms that can model the non-linearities present in the residual of the linear model, and fit a linear model with the main features and selected interaction terms.

More specifically, the first step 601, assembles linear features, in the form shown in Equation 1, for dependent variables y. The next step 602, fits a linear model using the linear features to a dataset of the process to be modeled. Then step 603, constructs the desired nonlinear higher order polynomial features. These features can include higher power terms of a single variable (e.g. $x_1^2$) and terms with multiple independent variables (e.g. $x_1 x_2$) and all possible combinations of the aforementioned. In step 604, the residual of the linear model created in step 602 is compared to the nonlinear features from step 603. Relevant nonlinear features are identified and selected based on how closely they fit the residual of the linear model. Then step 605 fits a model comprised of the linear features of step 601 and selected nonlinear features of step 604 to the dataset of the process to be modeled. The produced model will take the form shown in Equation 2. However, the inclusion of nonlinear terms will be minimized. Any model fitting technique, including AI Machine Learning, can be utilized in step 605. Finally, in step 606 the fitted model from step 605 can be used (as a working model 110 in FIG. 1) to make predictions about the behavior of the subject modeled process 124. Both FIG. 6 and described workflow 600 show a model with a single dependent variable y and two independent variables $x_1$ and $x_2$. The aforementioned technique is applicable to any amount of independent and dependent variables.

Similarly, even using regularization, GAM can introduce unnecessary non-linearities in the models, especially if the effect of some of the main variables is almost linear. To that end, Tay et al., ("Reluctant generalized additive modeling," (2020), *Xiv preprint arXiv*:1912.01808 pp. 1-20) which is incorporated herein in its entirety adapted the reluctant principle introduced by Yu et al., ("Reluctant Interaction Modeling," (2019), *arXiv preprint arXiv*:1907.08414 pp. 1-32) to create Reluctant GAM. The principle of Reluctant GAM is to prioritize the effect of main features over nonlinear features if all else is the same.

Figure 7:
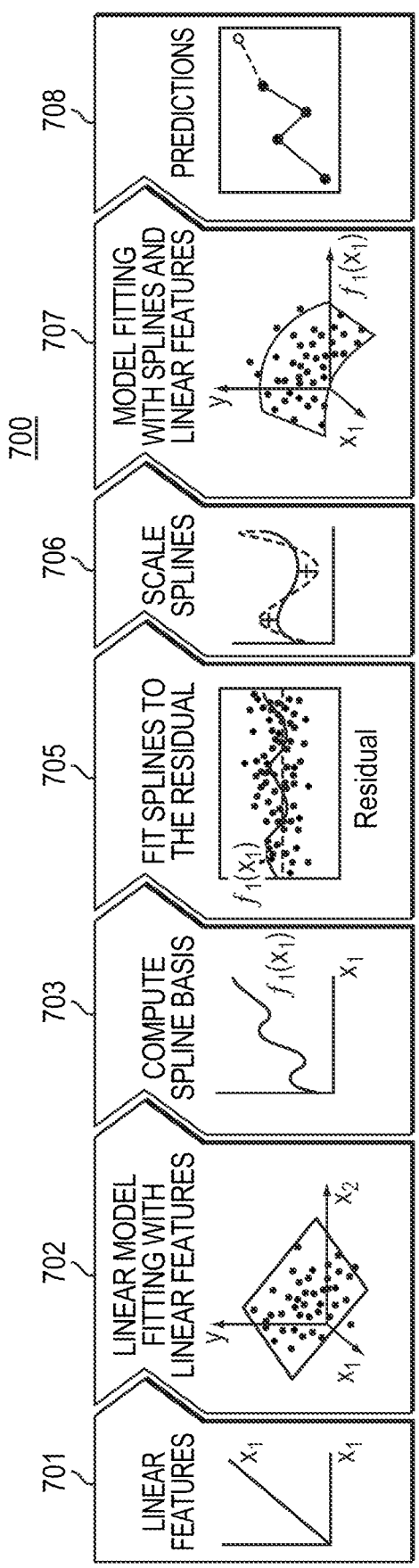
FIG. 7 illustrates a workflow for reluctant modeling applied to generalized additive models (GAM).

FIG. 7 illustrates workflow 700 for reluctant modeling applied to generalized additive models (GAM). Workflow 700 can be summarized in three main steps: fit a linear model as good as possible using main features only, fit and scale splines to the residual of the linear model, and fit a linear model with the main features and scaled splines.

More specifically, the first step 701, assembles linear features, in the form shown in Equation 1, for dependent variables y. The next step 702, fits a linear model using the linear features to a dataset of the process to be modeled. Then step 703, computes the splines basis functions $f_i$ utilizing the dataset of the process to be modeled. In step 705, the splines from step 703 are fitted to the residual of the linear model from step 702. In step 706, the fitted splines are scaled, again using the residual of the linear model. Steps 705 and 706 provide a similar functionality to step 604 of workflow 600, ensuring that complexity is added to the model only if it captures signals from the dataset. Then step 707 fits a model comprised of the linear features of step 701 and scaled spline features of step 706. Any model fitting technique, including AI Machine Learning, can be utilized in step 707. Finally, in step 708 the fitted model (serving as model 110 in FIG. 1) can be used to make predictions about the behavior of the subject modeled process 124. Both FIG. 7 and described workflow 700 show a model with a single dependent variable y and two independent variables $x_1$ and $x_2$ and their corresponding splines $f_1$ and $f_2$. The aforementioned technique is applicable to any amount of independent and dependent variables.

Reluctant First Principles

This section describes details of example embodiments of the present invention. The main aspects addressed are how to adapt reluctance principle modeling for use with first principles augmentation and how to combine it with generalized additive models.

Method 1: Reluctant First Principles with Linear Main Features

As explained previously, traditionally, to build an augmentation based Hybrid model, one can use the original measurable linear features and the usually nonlinear first principles transformations of the original features (usually physical properties and/or dimensionless numbers) to fit a linear regression model. For instance, if one is trying to model the yield of a plug flow reactor (PFR), some measurable variables that can be considered are the different feeds that enter the reactor; and examples of meaningful augmentation are physical properties such as density and thermal conductivity or dimensionless numbers such as Nusselt number or Reynolds number as non-limiting examples.

More concretely, if y is a dependent variable, $x_1, \ldots, x_n$ are independent variables (measurable linear features), and $z_1, \ldots, z_m$ represent first principle transformations of the original features (first principles augmented features), then $$y \approx a_1 x_1 + \ldots + a_n x_n + b_1 z_1 + \ldots + b_m z_m \quad (4),$$

where $a_i$, $b_j$ are constants for $i=1, \ldots n$, $j=1, \ldots, m$. Note that the augmented features $z_j$ are usually obtained via nonlinear formulas and transformations. For instance, Reynolds number is obtained by $Re = \rho u d/\mu$, where $\rho$ is the density of the fluid, u is mean velocity of the fluid, d is the hydraulic diameter of the pipe and $\mu$ is the dynamic viscosity of the fluid.

As mentioned in the previous section, a popular model choice is Lasso Regression as it performs an automatic feature selection reducing the amount of terms in Equation 4. However, the same shortcomings presented in the previous section, apply here as well: the feature selection of a Lasso Regression doesn't distinguish between measurable and augmented features. Thus, one of the keys of the present invention is adapting the reluctance principle to build more robust and interpretable Hybrid models. The adapted principle is the following:

Reluctant First Principles selection principle: One should prefer measurable linear features over first principles augmented features if all else is equal.

In order to build a working model 110 that respects this principle, a similar approach to reluctant interaction modeling is followed. The workflow can be summarized in by the following three major steps.

Step 1: Build a linear model using only measurable linear features as accurately as possible. For this step, one can use any linear regression model such as but not limited to OLS, Ridge Regression or Lasso Regression with cross validation to select the best parameter. By building this model first, the method is exploiting the full predictive power of the measurable effects, which is the essence of the reluctant principle. The resulting model should be a linear model in the form of Equation 1.

Step 2: Select the first principles features that can capture nonlinearities of the data the linear model built in Step 1 is unable to model. This step is very efficient as the selection is done by selecting the first principles features that are highly correlated with the residual of the linear model. The threshold to decide which features are important is a hyperparameter of the model. This step is another key of Applicant's method: instead of using interaction and higher order terms as in prior art reluctant modeling, the workflow and results are applied for first principles features.

Step 3: Fit a model with the measurable features (of Step 1) and the selected first principles features (of Step 2). In order to build sparse models, one can use a Lasso Regression model with cross validation to perform further feature selection from the measurable features and the selected first principles features. By fitting the model only on measurable linear features and augmentation features that can supplement the original set of variables, the method eliminates the possibility of selecting first principles features with similar predictive power as measurable data, which provides higher interpretability and simpler models.

FIG. 8 illustrates workflow 800 for augmented first principle modeling while respecting the reluctant first principle selection principle. From received data 101 (FIG. 1), the first step 801 assembles linear features, in the form shown in Equation 1, for dependent variables y. The next step 802 fits a linear model using the linear features to a dataset 105 of the process 124 to be modeled. In step 803, Relevant first principle features (e.g. viscosity, En, and We) are identified and selected based on how closely they fit the residual of the linear model generated in step 802. First principle features (e.g. surface tension and Re) that do not closely fit the residual, as defined by the hyper parameter of the model, are discarded. Then step 804 fits a model comprised of the linear features and selected first principle features to the dataset 105 of the process 124 to be modeled. The produced model will take the form shown in Equation 4. However, the inclusion of nonlinear first principle based terms will be minimized. Any model fitting technique, including AI Machine Learning, can be utilized in step 804. Finally, in step 805 the fitted model from step 804 can be used (as working model 110 in FIG. 1) to make predictions about the behavior of the subject modeled process 124. Because the model construction of workflow 800 favors linear features of measurable and observable variables, the produced models 110 and their predictions are easier to understand and interpret by plant operators than models produced by workflow 400 of FIG. 4.

Method 2: Reluctant First Principles for Generalized Additive Models

While the reluctant Hybrid models provided in Method 1 above are very powerful, in some cases, these models might still not be able to capture enough complexity to properly model a process 124 of interest. To that end, the next key of the present invention is how to combine first principles augmentation with another highly interpretable model: GAM.

Note that the traditional augmentation approach doesn't make sense anymore. In other words, if we fit a GAM with measurable and augmented features, with notations as above, we would obtain a model of the form:

$$y \approx f_1(x_1) + \ldots + f_n(x_n) + g_1(z_1) + \ldots + g_m(z_m) \quad (5)$$

where $f_i$, $g_j$ are smoothing splines for i=1, . . . , n, j=1, . . . , m, and where $x_1, \ldots, x_n$ are independent variables (measurable linear features), and $z_1, \ldots, z_m$ represent first principle transformations of the original features (first principles augmented features).

From a modeling point of view, the augmented features and terms composed of them and smoothing splines $g_j$ are treated as extra data and therefore, Equation 5 would be a valid model. However, if one tries to interpret this model, the limitations of this approach are apparent. Using the previous PFR example, there is no clear interpretation of what a spline transformation of augmented features such as Nusselt number or thermal conductivity means. For an operator in a plant, understanding how to vary certain controllable parameters to achieve the desired yield becomes impossible as, even if the spline function was simple such as a cubic transformation, the nonlinear relationship between the yield and the augmented variables, such as the Nusselt number, are intractable. Moreover, from a mathematical point of view, the model is highly complex as it is constructing spline transformations of already nonlinear variables, the first principles augmented features. Furthermore, the classic limitations of traditional machine learning still hold: no distinctions are made between measurable and augmented variables.

Embodiments of the present invention deal with these limitations using a modification of the reluctant approach from Yu et al., ("Reluctant Interaction Modeling," (2019), *arXiv preprint arXiv:*1907.08414 pp. 1-32) and Tay et al., ("Reluctant generalized additive modeling," (2020), *Xiv preprint arXiv:*1912.01808 pp. 1-20). Embodiments combine both reluctant methods to build interpretable model 110 with good predictive properties. The principle defining the reluctance approach is similar to the one in Method 1 above:

Reluctant First Principles selection principle: One should prefer measurable linear features over first principles augmented features or nonlinear trans-formations of the measurable data if all else is equal.

In order to combine GAMs and first principles to build a working model 110 that respects this principle, we will follow these steps:

Step 1: Build a linear model (OLS, Ridge or Lasso Regression) using only measurable linear features as accurately as possible. As pointed out in the previous method, this model is exploiting the full predictive power of the measurable effects, which is the essence of the reluctant principle.

Step 2: Select the most relevant features. To do so, the method distinguishes between two classes: first principles augmentation and spline transformations of the measurable data.

Step 2.1: Select first principle transformations of the original features that can nonlinearities of the data the linear model built in Step 1 is unable to model. This step is performed in the same manner as Step 2 of Method 1. Similarly, the threshold for which variables should be selected is a hyperparameter of the linear model.

Step 2.2: Compute spline basis for each measurable feature and fit the basis independently to the residual of the linear model. Scale the fitted splines so that the nonlinear terms are a fraction of the original features. The scaling factor is a hyperparameter of the model. This scaling is performed so that only features with strong enough nonlinearity will have an impact on the final model. This step is the same as Step 2 in the RGAM algorithm described in Tay et al., ("Reluctant generalized additive modeling," (2020), *Xiv preprint arXiv:*1912.01808 pp. 1-20).

These two parts of Step 2 can be performed simultaneously. The scaling and threshold parameter can be tuned via cross validation.

Step 3: Using a linear model, fit a non-linear model with the measurable features, the selected first principle transformations and the scaled splines. If one wishes to perform further feature selection, one can use a Lasso Regression model with feature selection in this step. As in the case of Method 1, by fitting the model only on measurable linear features, scaled nonlinear transformations, and augmented features that can supplement the original set of variables, embodiments of the present invention eliminate the possibility of selecting complex features with similar predictive power as measurable data, which provides higher interpretability and simpler models.

FIG. 9 illustrate workflow 900 for combined augmented first principle modeling and GAM while respecting the reluctant first principle selection principle. The first step 901 receives plant data 101, 105 (FIG. 1) and assembles linear features, in the form shown in Equation 1, for dependent variables y. Next, step 902 fits a linear model using the linear features to a dataset 105 of the process 124 to be modeled. In step 903 (referred to as step 2.1 above), Relevant first principle features (e.g. viscosity, etc.), are identified and selected on how closely they fit the residual of the linear model generated in step 902. First principle features (e.g. surface tension, etc.) that do not closely fit the residual, as defined by the hyper parameter of the model, are discarded. Then step 904 computes the spline basis functions f utilizing the dataset 105 of the process 124 to be modeled. In step 905, the splines from step 904 are fitted to the residual of the linear model from step 902. In step 906, the fitted splines are scaled, again using the residual of the linear model from step 902. Steps 904, 905, and 906 collectively are referenced as step 2.2 above. Collectively step 903 and steps 904, 905, and 906 capture the nonlinearity of the dataset 105 ignored by the linear model generated in step 902 and shown in that model's residual. Importantly, first principles and splines that do not capture that nonlinearity are either discarded or scaled to insignificance respectively. Then step 907 fits a model comprised of the linear features (from step 901), selected first principle features (from step 903), and scaled splines (from step 906) to the dataset 101, 105 of the process 124 to be modeled. However, the inclusion of nonlinear first principle based and scaled spline terms will be minimized. Any model fitting technique, including AI Machine Learning, can be utilized in step 907. Finally, in step 908 the fitted model from step 907 can be used (as process modeling system 130 model 110 in FIG. 1) to make predictions about the behavior of the modeled process 124 of interest.

Thus, the present invention provides workflows 800 and 900 to build non-linear working models 110 that can be easily interpreted by an operator in a plant 120 by emphasizing the importance of measurable and controllable data. Embodiments leverage domain knowledge in a way that can supplement the pure data driven model while avoiding unnecessary use of less intuitive transformations. Embodiments also provide the possibility of describing any extra trends in the data 105 via non-linear transformations of the main observable features to capture as much signal as possible from the real-time or current plant data in the most interpretable manner.

While example embodiments have been particularly shown and described, it will be understood by those skilled in the art that various changes in form and details may be made therein without departing from the scope of the embodiments encompassed by the appended claims.

What is claimed is:

1. A computer implemented method for generating an improved predictive model of an industrial process or process engineering system, the method comprising:
  receiving a dataset for a subject physics-based or chemistry-based process in an industrial plant, the dataset including data of measurable features of the subject process,
  constructing a linear model of the subject process using the received dataset, the linear model being a function of the measurable features of the subject process,
  selecting first principle features that capture nonlinearities in a residual of the constructed linear model,
  computing one or more splines for at least one measurable feature,
  fitting each computed spline to the residual of the constructed linear model,
  scaling each fitted spline with a scaling factor so that nonlinear terms are a fraction of the measurable features, and
  generating a working model of the subject process, the working model being a function of: (i) the measurable features of the subject process, (ii) at least one of the scaled splines, and (iii) the selected first principle features, the working model providing predictions of behavior of the subject process utilizing the data of the measurable features of the subject process.

2. The computer implemented method of claim 1 wherein the scaling factor is a hyperparameter of the constructed linear model.

3. The computer implemented method of claim 1 wherein constructing the linear model employs machine learning.

4. The computer implemented method of claim 1 wherein constructing the linear model uses at least one of: an ordinary least squares regression, ridge regression, least absolute shrinkage and selection operator (LASSO) regression, partial least squares regression, sparse partial least squares regression, and elastic net regression.

5. The computer implemented method of claim 1 wherein the working model is generated using a LASSO regression with feature selection, the LASSO regression generating a sparse algebraic model with reduced terms.

6. The computer implemented method of claim 1 wherein:
  the constructed linear model is comprised of linear submodels, each linear submodel describing a corresponding dependent variable as a linear expression of one or more independent variables; and
  the working model is comprised of algebraic submodels, each algebraic submodel describing a given corresponding dependent variable as an algebraic expression of one or more given independent variables.

7. The computer implemented method of claim 1 wherein selecting the first principle features is based on a threshold that is a hyperparameter of the constructed linear model.

8. The computer implemented method of claim 1 wherein the data of the measurable features of the subject process is historical data of the industrial plant.

9. A computer-based modeling system for generating an improved predictive model of an industrial process, the system comprising:
  a processor; and
  a memory with computer code instructions stored thereon, the processor and the memory, with the computer code instructions, being configured to cause the system to:
   receive a dataset for a subject physics-based or chemistry-based process in an industrial plant, the dataset including data of measurable features of the subject process,
   construct a linear model of the subject process using the received dataset, the linear model being a function of the measurable features of the subject process,
   select first principle features that capture nonlinearities in a residual of the constructed linear model,
   compute one or more splines for at least one measurable feature,
   fit each computed spline to the residual of the constructed linear model,
   scale each fitted spline with a scaling factor so that nonlinear terms are a fraction of the measurable features, and
   generate a working model of the subject process, the working model being a function of: (i) the measurable features of the subject process, (ii) at least one of the scaled splines, and (iii) the selected first principle features, the working model providing predictions of behavior of the subject process utilizing the data of the measurable features of the subject process.

10. The computer-based modeling system of claim 9 wherein the scaling factor is a hyperparameter of the constructed linear model.

11. The computer-based modeling system of claim 9 wherein the linear model is constructed using machine learning.

12. The computer-based modeling system of claim 9 wherein the linear model is constructed using at least one of: an ordinary least squares regression, ridge regression, LASSO least absolute shrinkage and selection operator (LASSO) regression, partial least squares regression, sparse partial least squares regression and elastic net regression.

13. The computer-based modeling system of claim 9 wherein the working model is generated using a LASSO regression with feature selection, the LASSO regression generating a sparse algebraic model with reduced terms.

14. The computer-based modeling system of claim 9 wherein:
the constructed linear model is comprised of linear submodels, each linear submodel describing a corresponding dependent variable as a linear expression of one or more independent variables; and
the working model is comprised of algebraic submodels, each algebraic submodel describing a given corresponding dependent variable as an algebraic expression of one or more given independent variables.

15. The computer-based modeling system of claim 9 wherein selecting the first principle features is based on a threshold that is a hyperparameter of the constructed linear model.

16. The computer-based modeling system of claim 9 wherein the data of the measurable features of the subject process is historical data of the industrial plant.

17. A non-transitory computer program product for generating an improved predictive model of an industrial process, the computer program product comprising:
a computer-readable medium with computer code instructions stored thereon, the computer code instructions being configured, when executed by a processor, to cause an apparatus associated with the processor to:
receive a dataset for a subject physics-based or chemistry-based process in an industrial plant, the dataset including data of measurable features of the subject process, construct a linear model of the subject process using the received dataset, the linear model being a function of the measurable features of the subject process,
select first principle features that capture nonlinearities in a residual of the constructed linear model,
compute one or more splines for at least one measurable feature,
fit each computed spline to the residual of the constructed linear model,
scale each fitted spline with a scaling factor so that nonlinear terms are a fraction of the measurable features, and
generate a working model of the subject process, the working model being a function of: (i) the measurable features of the subject process, (ii) at least one of the scaled splines, and (iii) the selected first principle features, the working model providing predictions of behavior of the subject process utilizing the data of the measurable features of the subject process.

* * * * *

UNITED STATES PATENT AND TRADEMARK OFFICE
CERTIFICATE OF CORRECTION

PATENT NO. : 11,630,446 B2
APPLICATION NO. : 17/176882
DATED : April 18, 2023
INVENTOR(S) : Victoria Gras Andreu and Sven Serneels It is certified that error appears in the above-identified patent and that said Letters Patent is hereby corrected as shown below:

In the Claims

In Column 19, Claim 12, Line 10, delete "LASSO" before "least absolute".

Signed and Sealed this
Thirtieth Day of May, 2023

Katherine Kelly Vidal
*Director of the United States Patent and Trademark Office*